United States Patent
Yamamoto et al.

(10) Patent No.: US 10,988,855 B2
(45) Date of Patent: Apr. 27, 2021

(54) PLATING DEVICE

(71) Applicant: YAMAMOTO-MS Co., Ltd., Tokyo (JP)

(72) Inventors: Wataru Yamamoto, Tokyo (JP); Kimiko Koiwa, Tokyo (JP); Katsunori Akiyama, Tokyo (JP); Masazumi Ishiguro, Tokyo (JP); Yoshiaki Hoshino, Saitama (JP)

(73) Assignee: YAMAMOTO-MS Co., Ltd., Tokyo (JP)

( * ) Notice: Subject to any disclaimer, the term of this patent is extended or adjusted under 35 U.S.C. 154(b) by 153 days.

(21) Appl. No.: 16/474,202

(22) PCT Filed: Dec. 28, 2016

(86) PCT No.: PCT/JP2016/089200
§ 371 (c)(1),
(2) Date: Jun. 27, 2019

(87) PCT Pub. No.: WO2018/123059
PCT Pub. Date: Jul. 5, 2018

(65) Prior Publication Data
US 2019/0352793 A1    Nov. 21, 2019

(51) Int. Cl.
*C25D 21/12* (2006.01)
*C25D 3/38* (2006.01)
*G01N 27/42* (2006.01)

(52) U.S. Cl.
CPC ............... *C25D 21/12* (2013.01); *C25D 3/38* (2013.01); *G01N 27/426* (2013.01)

(58) Field of Classification Search
CPC ..................................................... C25D 21/12
See application file for complete search history.

(56) References Cited

U.S. PATENT DOCUMENTS

| | | | | |
|---|---|---|---|---|
| 4,935,108 A | * | 6/1990 | Rohlev | G03F 7/26 204/434 |
| 5,275,711 A | | 1/1994 | Abys et al. | |
| 6,344,123 B1 | * | 2/2002 | Bhatnagar | C25D 5/10 204/230.2 |

(Continued)

FOREIGN PATENT DOCUMENTS

| | | |
|---|---|---|
| JP | 2002302798 A | 10/2002 |
| JP | 2004269953 A | 9/2004 |

(Continued)

*Primary Examiner* — Brian W Cohen
(74) *Attorney, Agent, or Firm* — Grumbles Law PLLC; Brittany Nanzing (57) ABSTRACT

A plating apparatus capable of preventing difference in an electrode potential between the pair of cathodes and a disturbance in a current distribution in Haring cell test and so on is provided. A plating apparatus (1) has an anode (12) and a pair of cathodes (13X) (13Y) which are provided in a plating bathtub (11); a plating power source (14) to supply an electric current between the anode (12) and the pair of cathodes (13X) (13Y); and a feedback circuit (21) to have an electrode potential of a first cathode (13X) equal to an electrode potential of a second cathode (13Y) while a summation of electric currents flowing through the pair of cathodes (13X) (13Y) is kept constant.

7 Claims, 5 Drawing Sheets

(56) References Cited

U.S. PATENT DOCUMENTS

2003/0070941 A1* 4/2003 Hirao .................... G01N 27/42
205/775
2010/0122908 A1* 5/2010 Takeguchi ............. C25D 17/12
205/83

FOREIGN PATENT DOCUMENTS

| JP | 2006199994 A | 8/2006 |
| JP | 2006342403 A | 12/2006 |

* cited by examiner

PLATING DEVICE

FIELD OF THE DISCLOSURE

The present invention relates to a plating apparatus which is used for, for example, Haring cell test and so on.

BACKGROUND OF THE INVENTION

Conventionally, Haring cell test is known as a method for evaluating a plating performance. According to Haring cell test, plating is performed with an anode disposed between a pair of cathodes, and macrothrowing power (uniform electroplating ability) of plating by which a material is plated on the pair of cathodes is evaluated.

According to electroplating, current density and an amount of a plated material (metal) basically have a proportional relationship. However, if a condition in which there is not much difference in an amount of the plated material relative to a wide range of current density is achieved, a film having a uniform thickness can be formed by plating on a product having a complex shape. Ability to provide a uniform plating-film-thickness regardless of a current density is referred to as macrothrowing power.

Macrothrowing power is largely dependent on a current distribution. A current distribution is roughly classified into a first current distribution and a second current distribution. The first current distribution is dependent on geometrical conditions (a shape of an object to be plated, a shape of a plating bathtub, an arrangement of electrodes and so on) in the plating bathtub regardless of plating bath, plating conditions and so on. The first current distribution can be determined by a mathematical calculation or the like. Majority of a plating distribution is dependent on the first current distribution.

However, when plating is actually performed, a polarization phenomenon occurs on a cathode interface, and a new current distribution, i.e. a second current distribution is generated. The second current distribution is dependent on electrochemical characteristics such as polarization on a cathode, a conductivity of the plating bath and so on, and is changed by a type of a plating bath, a type and an amount of an additive, or the like.

Figure 6A:
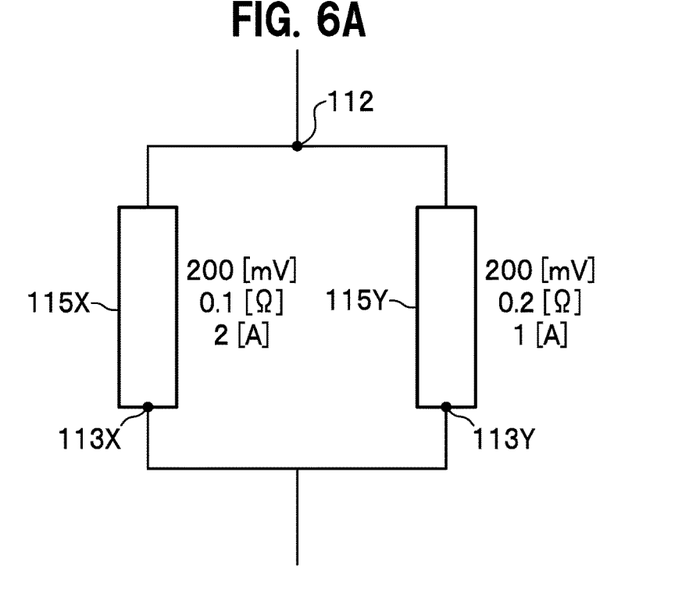
FIG. 6(a) is a circuit diagram showing an ideal system in Haring cell test.

An example of a circuit according to which a liquid between the anode and the pair of cathodes in Haring cell test is considered as an electric resistance, will be described. As shown in FIG. 6A, in an ideal system, a ratio of a distance between an anode 112 and a cathode 113X to a distance between the anode 112 and a cathode 113Y is set to be 1:2. When plating current 3 (A) is supplied to the whole of the system, current 2 (A) flows through the anode 113X, and current 1 (A) flows through the anode 113Y. Furthermore, voltage 200 (mV) is respectively applied to resistances 115X, 115Y between the anode 112 and cathodes 113X, 113Y.

Figure 6B:
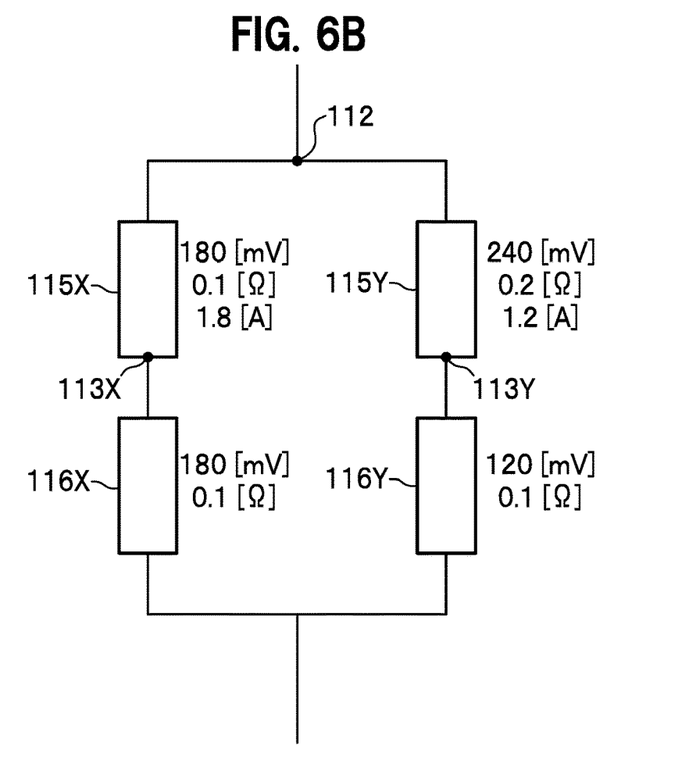
FIG. 6(b) is a circuit diagram showing an actual system in Haring cell test.

On the other hand, as shown in FIG. 6B, according to an actual system, there are resistance components 116X, 116Y such as a wiring resistance, a contact resistance of a clip. For this reason, a distribution ratio between plating currents does not become 2:1, and disturbance in the current distribution is caused. Furthermore, potential differences between the anode 112 and the cathodes 113X, 113Y are 180 (mV), 240 (mV), respectively, so they are different from each other. A matter like this is caused also by an ammeter for measuring values of electric currents which flow through the cathodes 113X, 113Y.

That is, according to the actual system, an accurate measurement of the second current distribution is disturbed by a wiring resistance, a clip contact resistance and so on.

SUMMARY OF THE INVENTION

The present invention has been designed in view of the above problem, and it is an objective of the present invention to provide a plating apparatus capable of preventing a disturbance in a current distribution and difference in an electrode potential between a pair of cathodes in Haring cell test.

In order to achieve the above-mentioned objective, a plating apparatus of the present invention is characterized by comprising an anode and a pair of cathodes which are provided in a plating bathtub; a plating power source for supplying an electric current between the anode and the pair of cathodes; a feedback circuit to have an electrode potential of a first cathode of the pair of cathodes equal to an electrode potential of a second cathode of the pair of cathodes while a summation of electric currents flowing through the pair of cathodes is kept constant.

The plating apparatus according to the present invention can prevent a disturbance in a current distribution and prevent difference in an electrode potential between a pair of cathodes while a summation of electric currents flowing through the pair of cathodes is kept constant.

DETAILED DESCRIPTION

An embodiment of the present invention will be described in detail with reference to the drawings as an example according to which a plating apparatus of the present invention applied as a plating tester of Haring cell test. In the explanation, the same element has the same symbol, and a duplicate explanation is omitted.

Embodiment

Figure 1:
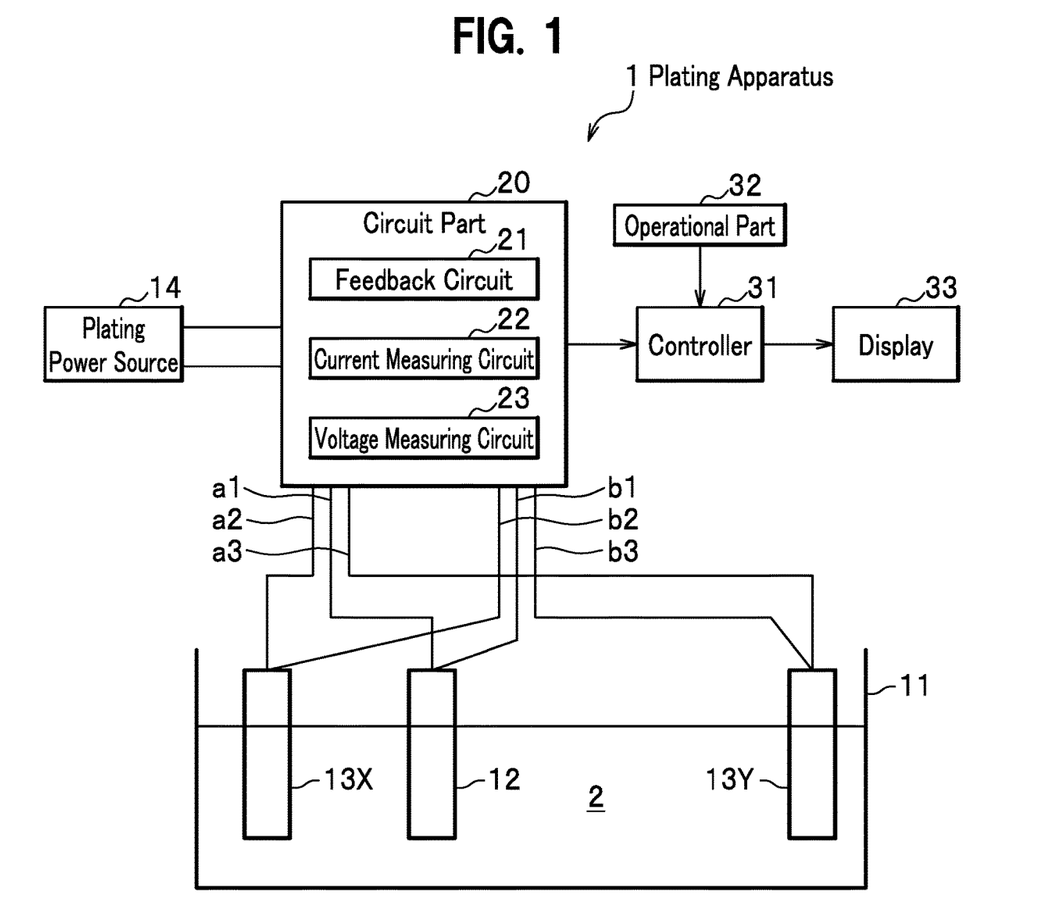
FIG. 1 is a schematic view showing a plating apparatus according to an embodiment of the present invention.

As shown in FIG. 1, a plating apparatus 1 according to an embodiment of the present invention is a plating tester to carry out Haring cell test according to which plating is simultaneously performed on a pair of cathodes 13X, 13Y, and macrothrowing power is evaluated based on a weight of a plated material. According to the plating apparatus 1, plating is performed, for example, by electrolysis under a constant electric current or electrolysis under a constant voltage (according to this embodiment, electrolysis under a constant electric current according to which a summation of electric currents flowing through the pair of cathodes 13X, 13Y is constant, and under a constant voltage). The plating apparatus 1 comprises a plating bathtub 11, an anode 12, the pair of cathodes 13 (13X, 13Y), a plating power source (rectifier) 14, a circuit part 20, a controller 31, an operational part 32, and a display 33.

<Plating Bathtub>

Plating bath 2 is put in the plating bathtub 11. The plating bath 2 may be a copper sulfate plating bath (general bath, High throwing bath).

<Anode>

The anode 12 is a metal plate which is disposed between the pair of cathodes 13X, 13Y in the plating bathtub 11 and is submerged in the plating bath 2. The anode 12 can change a distance between each cathode 13X, 13Y. That is, between the pair of cathodes 13X, 13Y, the anode 12 can approach one cathode 13X (that is, go away from the other cathode 13Y), or approach the other cathode 13Y (that is, go away from the one cathode 13X).

<Cathode>

The pair of cathodes 13X, 13Y are apart from each other, and are metal plates submerged in the plating bath 2 while the anode 12 is disposed between the pair of cathodes. At least one of the cathodes 13X, 13Y may be a metal object to become a product on which a material is actually plated.

Furthermore, a positional relation between the anode 12 and the pair of cathodes 13X, 13Y is not limited to the above-mentioned positional relation, For example, the pair of cathodes 13X, 13Y may be disposed on one side of the anode 12 at different distances from the anode 12.

<Plating Power Source (Rectifier)>

The plating power source (rectifier) 14 supplies an electric current for plating to the pair of cathodes 13X, 13Y. The plating power source 14 is electrically connected to the anode 12 and the pair of cathodes 13X, 13Y through the circuit part 20, and is a DC power source for supplying an electrical current to deposit a material on the pair of cathodes 13X, 13Y. According to this embodiment, the plating power source 14 is a constant-current power source. A summation of an electric current flowing through the cathode 13X and an electrical current flowing through the cathode 13Y is set constant.

<Circuit Part>

The circuit part 20 composes an electric circuit with the anode 12, the pair of cathodes 13X, 13Y, and the plating power source 14. The circuit part 20 has a feedback circuit 21, a current measuring circuit 22, and a voltage measuring circuit 23.

<Feedback Circuit>

The feedback circuit 21 carries out a feedback control based on voltages (potentials) of the respective cathodes 13X, 13Y and the anode 12 so as to have an electrode potential of a first cathode of the pair of cathodes 13X, 13Y equal to an electrode potential of a second cathode of the pair of cathodes. In other words, the feedback circuit 21 carries out a feedback control based on voltages (potentials) of the respective cathodes 13X, 13Y and the anode 12 so as to have a potential difference between the anode 12 and the cathode 13X equal to a potential difference between the anode 12 and the cathode 13Y. This feedback control is carried out in a state of a constant electric current according to which a summation of an electric current flowing through the cathode 13X and an electric current flowing through the cathode 13Y is kept constant. This state of a constant electric current may be achieved by an ability of the plating power source 14, or may be achieved by a circuit structure of the circuit part 20.

<Current Measuring Circuit>

The current measuring circuit 22 measures respective electric current values flowing through the pair of cathodes 13X, 13Y, and outputs measured electric current values to the controller 31.

<Voltage Measuring Circuit>

The voltage measuring circuit 23 measures respective electrode potentials of the pair of cathodes 13X, 13Y, that is, voltage values, and outputs measured voltage values to the controller 31. In a case where measurement of voltage values is unnecessary, the voltage measuring circuit 23 can be omitted.

<Controller>

The controller 31 has a CPU (Central Processing Unit), a ROM (Read-Only Memory), a RAM (Random Access Memory), an input/output circuit and so on. The controller 31 beforehand stores distances (or a ratio between the distances) between the anode 12 and the pair of cathodes 13X, 13Y outputted by the operational part 32 before an actual test. Or the controller 31 obtains distances (or a ratio between the distances) between the anode 12 and the pair of cathodes 13X, 13Y outputted by the operational part 32 before calculating various parameters, and calculates various parameters based on the obtained distances (or a ratio between the distances). Furthermore, the controller 31 obtains electric current values flowing through the pair of cathodes 13X, 13Y measured by the current measuring circuit 22, and outputs them to the display 33. And furthermore, the controller 31 obtains voltage values applied to the pair of cathodes 13X, 13Y measured by the voltage measuring circuit 23, and outputs them to the display 33.

Furthermore, the controller 31 can calculate a current distribution ratio, which is a ratio of an electric current flowing through the first cathode to an electric current flowing through the second cathode based on the electric current values flowing through the pair of cathodes 13X, 13Y measured by the current measuring circuit 22 (in detail, a first ammeter 22X and a second ammeter 22Y to be described later), and can output them to the display 33.

And furthermore, the controller 31 can calculate an amount (theoretical amount) of the plated material on the pair of cathodes 13X, 13Y based on the electric current values (integrated electric current value) flowing through the pair of cathodes 13X, 13Y, and can output them to the display 33. The theoretical amount A (g) of the plated material is calculated by the following equation with use of an electric current I (A) flowing through the pair of cathodes 13, an energizing time t (s), Faraday constant F (C/mol), an atomic weight M (g/mol) of a metal plated by plating, and the valency number of an ion z.

$$A = I \times t \times M / (z \times F)$$

Where, Faraday constant F is stored beforehand in the controller 31. An electric current I is measured by the current measuring circuit 22. An energizing time t is measured by the controller 31. The atomic weight M and the valency number of an ion z are input into the controller 31 by user's operation of the operational part 32, or are selected from among values stored beforehand in the controller 31 by user's operation of the operational part 32.

A relationship between an electric current value flowing through the cathodes 13 and an actual amount of the plated material on the cathodes 13 is stored in the controller 31. That is, an electric current value flowing through the cathodes 13 and an amount of the plated material which is actually plated on the cathodes 13 at the electric current value per unit time are stored based on past experiments as a map and so on with a connection with each other and this is applied to each cathode 13X, 13Y. A user measures a weight of each cathode 13X, 13Y before plating, and a weight (weight including the plated material) of each cathode 13X, 13Y after plating with use of a weight measuring instrument. Then the user obtains an amount (measured amount) of the plated material on each cathode 13X, 13Y by referring to a difference between them. And then, the user stores the relationship in the controller 31 through user's operation of the operational part 32, which relationship is based on the measured amount of the plated material and the electric current values (values measured by ammeters 22X, 22Y) flowing through the pair of cathode 13X, 13Y. The controller 31 can calculate an amount (estimated amount) of the plated material by referring to the relationship with use of results (electric current values flowing through the pair of cathodes 13X, 13Y) measured by ammeters 22X, 22Y and by taking the energizing time t into consideration, and can output it to the display 33.

Furthermore, the controller 31 can calculate a uniform electroplating index $T_A$ based on pre-stored distances between the anode 12 and the pair of cathodes 13X, 13Y and the estimated amount of the plated material on the pair of cathodes 13X, 13Y which is calculated, and can output it to the display 33. Where, when we assume that a distance between a cathode 13 closer to the anode 12 and the anode 12 is $d_1$, a distance between a cathode 13 further from the anode 12 and the anode 12 is $d_2$, an estimated amount of a material plated on a cathode 13 closer to the anode 12 is $A_1$, and an estimated amount of the plated material on a cathode 13 further from the anode 12 is $A_2$, the uniform electroplating index $T_A$ (%) can be calculated by the following equation:

$$T_A = \{(d_2/d_1) - (A_1/A_2)\} / \{(d_2/d_1) + (A_1/A_2) - 2\} \times 100$$

where the estimated amounts $A_1$, $A_2$ of the plated material are calculated with use of the relationship between the above-mentioned electric current values and the actual amounts of the plated material (measured amounts of the plated material in the prior-experiment). The distances $d_1$ and $d_2$ between the anode and the pair of cathodes are stored in the controller 31 through an operation of the operational part 32 by a user who saw a scale (a scale indicating a distance ratio, or a measure indicating a mere distance, which is not shown in the drawings) provided to the plating bathtub 11, or selected from among values stored beforehand in the controller 31 through user's operation of the operational part 32.

The uniform electroplating index $T_A$ (%) is a parameter indicating a degree of the uniformity of the plated material on the pair of cathodes 13X, 13Y. The uniform electroplating index $T_A$ is a value which can be changed within the range of about −100% to about +100%. When a current distribution ratio of an electric current flowing through the first cathode to an electric current flowing through the second cathode is equal to a anode-cathode distance ratio $d_2/d_1$, an uniform electroplating index $T_A$ is 0(%). Furthermore, when amounts of the plated material on the pair of cathodes 13X, 13Y are equal to each other, an uniform electroplating index $T_A$ is 100(%) regardless of an anode-cathode distance ratio $d_2/d_1$. That is, an uniform electroplating index $T_A$ indicates that an electroplating is performed more uniformly on the pair of cathodes 13X, 13Y as an index $T_A$ becomes closer to 100(%).

And furthermore, the controller 31 can also calculate a uniform electroplating index $T_B$ with use of an electric current actually flowing through each cathode 13X, 13Y, and can output it to the display 33. Where, when a value of an electric current flowing through a cathode 13 closer to the anode 12 is $I_1$, and a value of an electric current flowing through a cathode 13 further from the anode 12 is $I_2$, a uniform electroplating index $T_B$ (%) can be calculated by the following equation:

$$T_B = \{(I_1/I_2) - (A_1/A_2)\} / \{(I_1/I_2) + (A_1/A_2) - 2\} \times 100$$

where estimated amounts $A_1$, $A_2$ of the plated material are calculated with use of the relationship between the above-mentioned electric current values and the actual amount of the plated material (measured amount of the plated material in the prior-experiment). The electric current values $I_1$, $I_2$ are measured by the current measuring circuit 22.

A uniform electroplating index $T_A$ using distances $d_1$, $d_2$ between the anode and the pair of cathodes is a value relatively close to a theoretical value, on the other hand, a uniform electroplating index $T_B$ using electric current values $I_1$, $I_2$ actually flowing (or current distribution ratio $I_1/I_2$) is close to a value to indicate the performance of an actual plating bath 2 (for example, the performance of additives). A user can find the performance and the state (for example, the performance and the balance of additives) of the plating bath 2 by observing the value change of a uniform electroplating index $T_B$ associated with the changes of electric current values $I_1$, $I_2$ (current distribution ratio $I_1:I_2$, $I_1/I_2$, or the like).

The controller 31 can also calculate the uniform electroplating indexes $T_A$, $T_B$ with use of the theoretical amount of the plated material, and can output them to the display 33. In this case, uniform electroplating indexes $T_A$, $T_B$ based on the estimated amount of the plated material and uniform electroplating indexes $T_A$, $T_B$ based on the theoretical amount of the plated material can be compared by a user.

Furthermore, the controller 31 can calculate an electric current efficiency based on an estimated amount of the plated material and a theoretical amount of the plated material, and can output it to the display 33. The electric current efficiency is a parameter to indicate how efficiently an electric current flowing through the cathodes 13X, 13Y is used to deposit a material.

Electric current efficiency (%)=(Estimated amount of the plated material/Theoretical amount of the plated material)×100

Regarding an electric current efficiency, an electric current efficiency at each cathode 13X, 13Y as well as a synthetic electric current efficiency based on the summation of the plated material on the cathodes 13X, 13Y can be also calculated.

Figure 2:
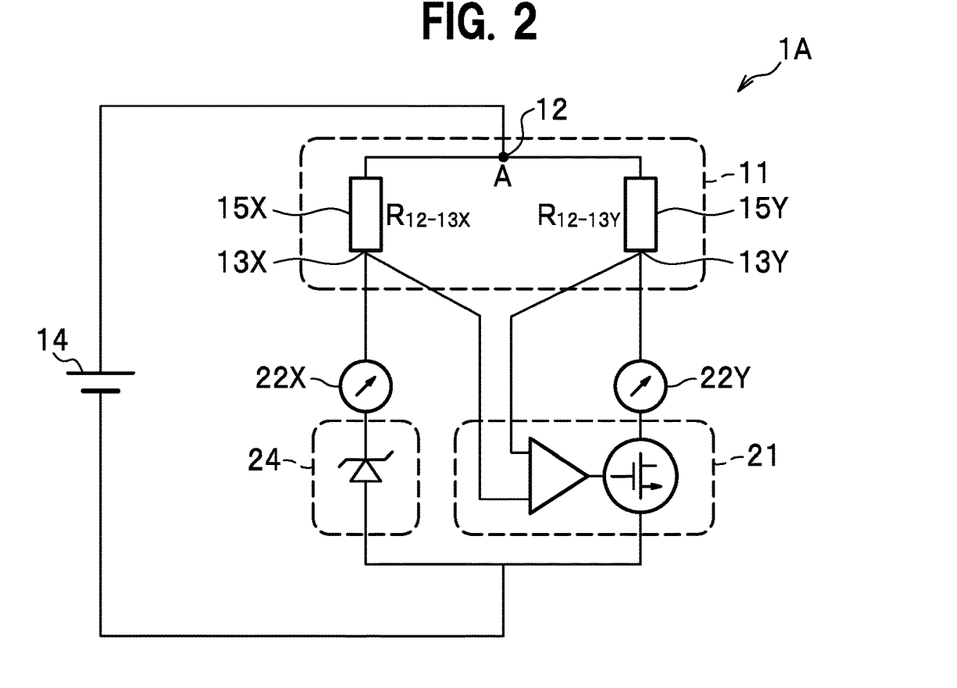
FIG. 2 is a circuit diagram showing a plating apparatus according to a first embodiment of the present invention.
Figure 3:
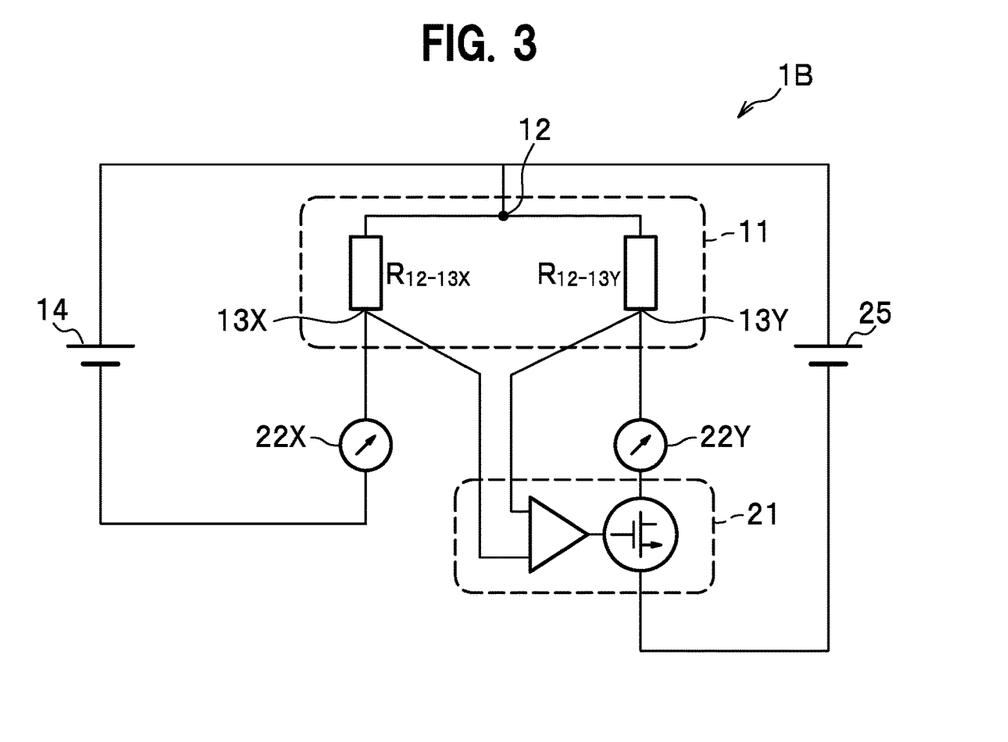
FIG. 3 is a circuit diagram showing a plating apparatus according to a second embodiment of the present invention.

A user of the plating apparatus 1, 1A, 1B can actually measure an amount of the plated material (measured amount of the plated material) on the cathodes 13X, 13Y with use of a weight measuring instrument, and can input the measured amount of the plated material into the controller 31 through an operation of the operational part 32.

In this case, the controller 31 can obtain the measured amount of the plated material output from the operational part 32, can calculate an electric current efficiency based on the obtained measured amount of the plated material and a calculated theoretical amount of the plated material, and can output it to the display 33.

Electric current efficiency (%)=(Measured amount of the plated material/Theoretical amount of the plated material)×100

This electric current efficiency may be calculated regarding a summation of the plated material on the pair of cathodes 13X, 13Y, or may be calculated regarding an individual amount of the plated material of each cathode 13X, 13Y.

The controller 31 can calculate a uniform electroplating indexes $T_A$, $T_B$ and an electric current efficiency per a current density of each cathode 13X, 13Y, and can output them to the display 33 with connections of the current density. A current density is calculated by the following equation using an electric current value $I_x$ flowing through the cathode 13X, an electric current value $I_Y$ flowing through the cathode 13Y, an effective surface area (surface area, in the plating bath 2, on which a material can be plated) $S_X$ of the cathode 13X, and an effective surface area (surface area, in the plating bath 2, on which a material can be plated) $S_Y$ of the cathode 13Y.

Mean current density at the pair of cathodes 13$X$, 13$Y$ (A/m$^2$)=($I_X$+$I_Y$)/($S_X$+$S_Y$)

Current density of the cathode 13$X$ (A/m$^2$)=$I_X$/$S_X$

Current density of the cathode 13$Y$ (A/m$^2$)=$I_Y$/$S_Y$

Effective surface areas $S_X$, $S_Y$ of the cathodes 13X, 13Y are stored beforehand in the controller 31, or are input into the controller 31 through a user's operation of the operational part 32 before calculating current densities. According to this embodiment, the cathode 13X and the cathode 13Y have the same shape, and the effective surface area $S_X$ and the effective surface area $S_Y$ are equal to each other. The present invention can be also applied to a case where the cathode 13X and the cathode 13Y don't have the same shape, or to a case where the effective surface area $S_X$ and the effective surface area $S_Y$ are not equal to each other.

<Operational Part>

The operational part 32 is composed of a keyboard, a mouse, and so on. The operational part 32 outputs to the controller 31 an operational result produced by an operation by a user. For example, the operational part 32 outputs respective distances (or a distance ratio) between the anode 12 and the pair of cathodes 13X, 13Y to the controller 31 by an operation by a user.

<Display>

The display 33 is a monitor. The display 33 displays as a graph the variation of an electric current value, a voltage value and so on with time outputted from the controller 31.

First Embodiment

FIG. 2 is a circuit diagram according to which a resistance 15X of the anode 12 and the cathode 13X, and a resistance 15Y of the anode 12 and the cathode 13Y are schematically described to show a structure of the plating bathtub 11 having the anode 12 and the pair of cathodes 13X, 13Y. As shown in FIG. 2, the plating apparatus 1A according to the first embodiment of the present invention performs plating by constant-current electrolysis in a state of a constant electric current according to which a summation of electric currents flowing through the pair of cathodes 13X, 13Y is kept constant. The plating apparatus 1A, as an electric circuit, has the plating power source 14, the pair of resistances 15X, 15Y, the pair of ammeters 22X, 22Y, the feedback circuit 21, and a constant-voltage circuit 24. According to this circuit, the resistance 15X, the ammeter 22X and the constant-voltage circuit 24 are connected in series, the resistance 15Y, the ammeter 22Y and the feedback circuit 21 are connected in series. Furthermore, a combination of the resistance 15X, the ammeter 22X and the constant-voltage circuit 24 and a combination of the resistance 15Y, the ammeter 22Y and the feedback circuit 21 are disposed in parallel for the plating power source 14.

<Plating Power Source>

According to this embodiment, a positive electrode of the plating power source 14 is electrically connected to the anode 12, and a negative electrode of the plating power source 14 is electrically connected to the pair of cathodes 13X, 13Y.

<Resistance>

The resistance 15X is a cell resistance to indicate a potential difference between the anode 12 and the cathode 13X. The resistance 15Y is a cell resistance to indicate a potential difference between the anode 12 and the cathode 13Y.

<Ammeter>

The ammeter 22X, which is one of the current measuring circuit 22, measures an electric current value flowing through the resistance 15X, i.e. through the cathode 13X. The ammeter 22Y, which is one of the current measuring circuit 22, measures an electric current value flowing through the resistance 15Y, i.e. through the cathode 13Y.

<Feedback Circuit>

The feedback circuit 21 performs control so as to have an electrode potential of the cathode 13Y equal to that of the standard cathode 13X (an electrode potential difference between the cathode 13X and the cathode 13Y becomes zero). The feedback circuit 21 is not limited to an FET (Field Effect Transistor) shown by the Figures, and can be realized with a bipolar transistor, a semiconductor element, or the like.

<Constant-Voltage Circuit>

The constant-voltage circuit 24, which is one of the circuit part 20, is a circuit for raising an electrode potential of the cathode 13X in order to put an electrode potential of the cathode 13Y in a voltage range in which the feedback circuit 21 can control. The plating apparatus 1A may have a diode or a resistance having an operational effect similar to the constant-voltage circuit 24, instead of the constant-voltage circuit 24.

When this electric circuit is constructed, signal input lines b1, b2, b3 (refer to FIG. 1) for measuring an electric current value and a voltage value and clips (not shown) for connecting the signal input lines b1, b2, b3 to the electrodes 12, 13X, 13Y, respectively are provided separately from signal input lines a1, a2, a3 (refer to FIG. 1) for energizing the respective electrodes 12, 13X, 13Y and clips (not shown) for connecting the signal input lines a1, a2, a3 to the electrodes 12, 13X, 13Y, respectively. That is, they are separate from each other.

Second Embodiment

A circuit diagram of a second embodiment of the present invention will be explained mainly about difference from the plating apparatus 1A of the first embodiment. As shown in FIG. 3, the plating apparatus 1B according to the second embodiment of the present invention performs plating by constant-current electrolysis in a state of a constant electric current according to which a summation of electric currents flowing through the pair of cathodes 13X, 13Y is kept constant. The plating apparatus 1B has an auxiliary power source 25 as a component of an electric circuit instead of the constant-voltage circuit 24.

<Auxiliary Power Source and Plating Power Source>

The auxiliary power source (rectifier) 25, which is one of the circuit part 20, is a direct current power source to supply a plating current to the cathode 13Y. According to this embodiment, the auxiliary power source 25 is a constant-current power source, and a combination of the plating power source 14 and the auxiliary power source 25 makes a summation of an electric current flowing through the cathode 13X and an electric current flowing through the cathode 13Y constant. A positive electrode of the auxiliary power source 25 is electrically connected to the anode 12, and a negative electrode is electrically connected to the cathode 13Y.

According to this embodiment, the plating power source 14 supplies a plating current to the cathode 13X. A positive electrode of the plating power source 14 is electrically connected to the anode 12, and a negative electrode is electrically connected to the cathode 13X.

According to this electric circuit, a plating current from the plating power source 14 flows through the cathode 13X, a plating current from the auxiliary power source 25 flows through the cathode 13Y, and a total plating current of the cathodes 13X, 13Y flows through the anode 12.

An electrode potential of the negative electrode of the auxiliary power source 25 is set to be lower than that of the negative electrode of the plating power source 14 by the prescribed range (for example, a several hundred (mV) to a several (V)). This is a preliminary step in order to put an electrode potential of the cathode 13Y in a voltage range in which the feedback circuit 21 can control an electrode potential of the cathode 13Y. Furthermore, the auxiliary power source 25 has an ability to sufficiently provide a plating current flowing through the cathode 13Y.

When this electric circuit is constructed, signal input lines b1, b2, b3 (refer to FIG. 1) for measuring an electric current value and a voltage value and clips (not shown) for connecting the signal input lines b1, b2, b3 to the electrodes 12, 13X, 13Y, respectively are provided separately from signal input lines a1, a2, a3 (refer to FIG. 1) for energizing the respective electrodes 12, 13X, 13Y and clips (not shown) for connecting the signal input lines a1, a2, a3 to the electrodes 12, 13X, 13Y, respectively. That is, they are separate from each other.

Since the feedback circuit 21 has electrode potentials of the cathode 13X, 13Y equal to each other while a summation of electric currents flowing through the cathodes 13X, 13Y is kept constant, respective plating apparatus 1, 1A, 1B according to embodiments of the present invention can exclude affection of resistance elements such as a wiring resistance, a contact resistance and the like which a circuit can have, and can carry out Haring cell test based on an unaffected secondary current distribution.

Furthermore, each plating apparatus 1, 1A, 1B can measure an amount of the plated material and an uniform electroplating index $T_B$ (per a current density, in more detail, per a mean current density flowing through the pair of cathodes 13X, 13Y), which are high producible and high reliable, based on an unaffected secondary current distribution.

And furthermore, each plating apparatus 1, 1A, 1B can carry out Haring cell test without adverse effects of the ammeters 22X, 22Y.

Furthermore, each plating apparatus 1, 1A, 1B can accurately calculate a current distribution ratio ($I_1:I_2$, $I_1/I_2$, or the like) flowing through the cathodes 13X, 13Y by using measurement results measured by the ammeters 22X, 22Y.

Based on a theoretical amount of the plated material and an estimated amount of the plated material on cathodes 13X, 13Y which are calculated by plating apparatus 1, 1A, 1B, a user of each plating apparatus 1, 1A, 1B can find an electric current efficiency at cathodes 13X, 13Y (per a current density, in more detail, per a mean current density at the pair of cathodes 13X, 13Y, or an individual current density at each cathode 13X, 13Y), that is, a cathode electric current efficiency at the whole or each of the pair of cathodes 13X, 13Y.

Since a current distribution ratio, an electric current efficiency, and a uniform electroplating index $T_B$ greatly change depending on components of the plating bath 2, a user can find the variations of the characteristics and of the state of the plating bath 2 with time by observing the variations of a current distribution ratio, an electric current efficiency, and a uniform electroplating index $T_B$ with time.

EXAMPLES

Example 1

Figure 4A:
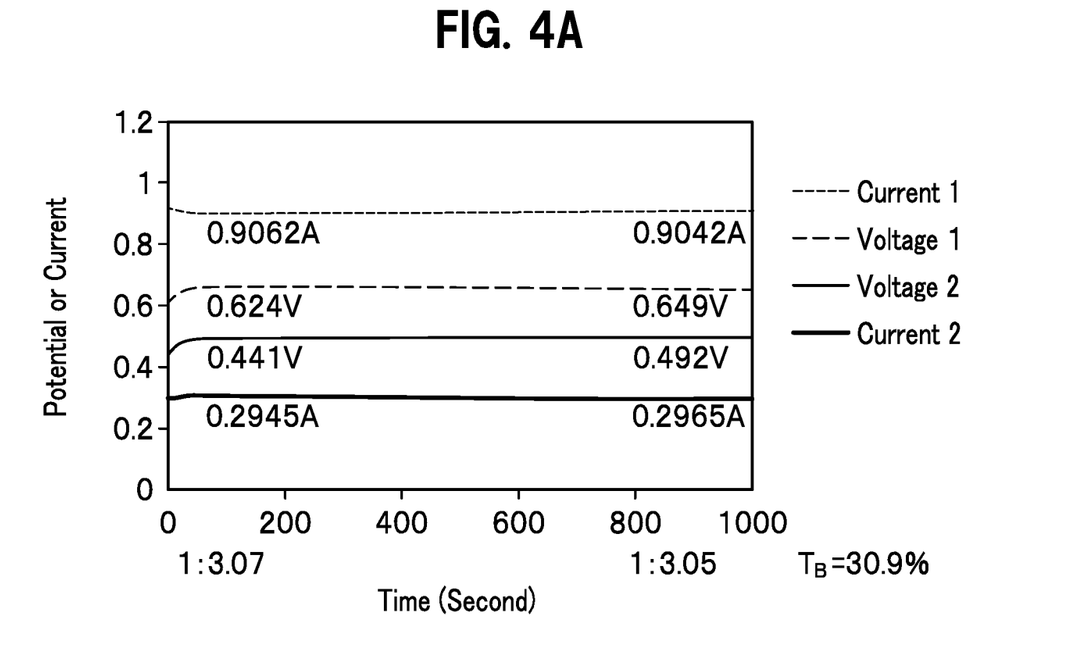
FIG. 4(a) is a graph showing the variation of an electric current value and a voltage value of cathodes with time in a case where correction to an electrode potential by use of a feedback circuit was not performed.

A copper sulfate plating was performed in a general bath without additives. A total electric current of an electric circuit was set to be 1.2 (A), and an anode-cathode distance ratio (a distance between the anode 12 and the cathode 13X:a distance between the anode 12 and the cathode 13Y) was set to be 1:5. The variations of an electric current value and a voltage value of the cathodes 13X, 13Y with time in a case (comparative example) where correction to an electrode potential by the feedback circuit 21 in the plating apparatus 1A was not carried out are shown in FIG. 4A. The variations of an electric current value and a voltage value of the cathodes 13X, 13Y with time in a case (example) where a potential correction to electrode was performed by the feedback circuit 21 of the plating apparatus 1A was carried out are shown in FIG. 4B.

As shown in FIG. 4A, in a case where correction to an electrode potential was not performed, a potential difference of about 160 (mV) between electrode potentials of the pair of cathodes 13X, 13Y was caused in 1000 (seconds) after starting of plating. Furthermore, by effect caused by a wiring resistance and so on, an electric current ratio (electric current value flowing through the cathode 13X:electric current value flowing through the cathode 13Y) was 1:3.05 which is a relatively low ratio. This is because a wiring resistance and the like make values of electric currents flowing through the pair of cathodes 13X, 13Y equal to each other. Therefore, a uniform electroplating index $T_B$ using an estimated amount of a plated material became 30.9(%) which is a relatively large value.

Figure 4B:
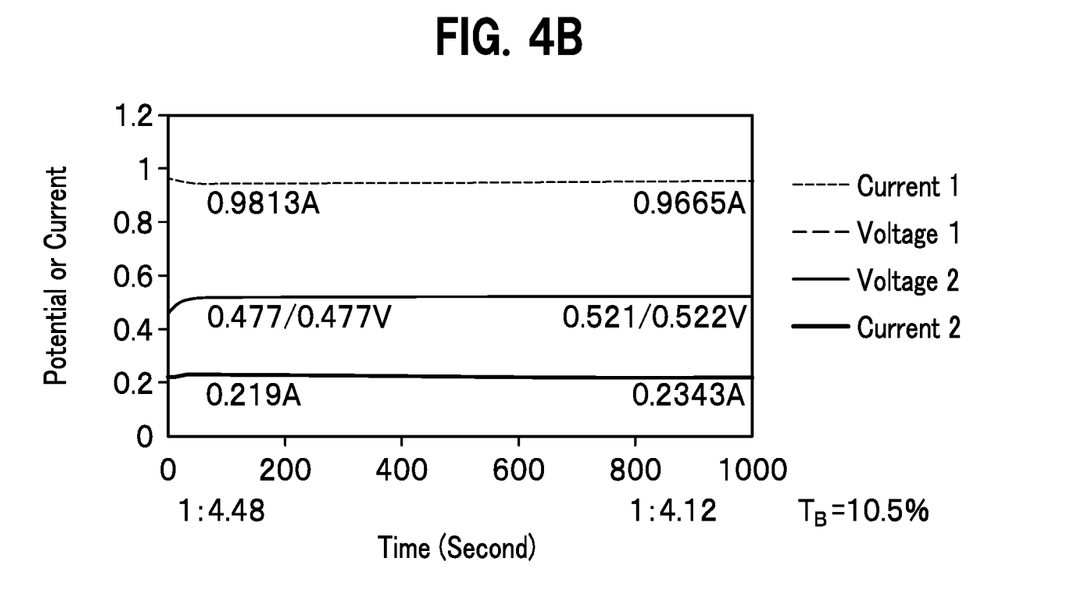
FIG. 4(b) is a graph showing the variation of an electric current value and a voltage value of cathodes with time in a case where correction to an electrode potential by use of the feedback circuit was performed.

Contrary to this, as shown in FIG. 4B, in a case where correction to an electrode potential was performed, electrode potentials of the pair of cathodes 13X, 13Y became exactly equal to each other in a range of a measurement error. A current distribution ratio was 1:4.12 because adverse effect caused by the wiring resistance and so on was eliminated. For this reason, a uniform electroplating index $T_B$ using an estimated amount of a plated material dramatically reduced to 10.5(%). That is, it was understood that the uniform electroplating index $T_B$ at the plating bath 2 used in the example 1 based on the estimated amount of the plated material was 10.5(%) in actual.

Example 2

A copper sulfate plating was performed without additives with use of the plating apparatus 1A. A total electric current of an electric circuit was set to be 1.2 (A), and an anode-cathode distance ratio was set to be 1:5. An electrode potential correction was carried out by the feedback circuit 21, and plating was performed in a general bath and in a High throwing bath. The variation of a current distribution ratio with time in this case is shown in FIG. 5A, and the variation of an electrolytic voltage with time is shown in FIG. 5B.

Figure 5A:
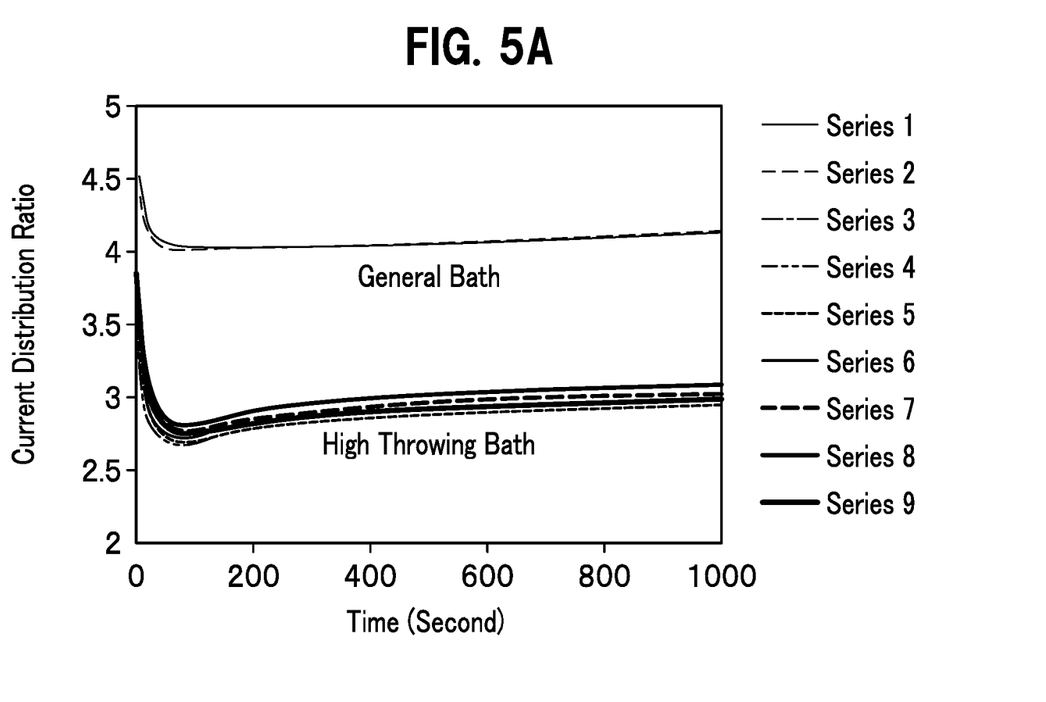
FIG. 5(a) is a graph showing the variation of a current distribution ratio with time in a case where correction to an electrode potential by use of the feedback circuit was performed.

As shown in FIG. 5A, there is clearly difference in a current distribution between the types of the plating bath 2. A uniform electroplating index $T_B$ at a general bath based on an estimated amount of a plated material was 11(%), and a uniform electroplating index $T_B$ at the High throwing bath based on an estimated amount of the plated material was 33(%).

Figure 5B:
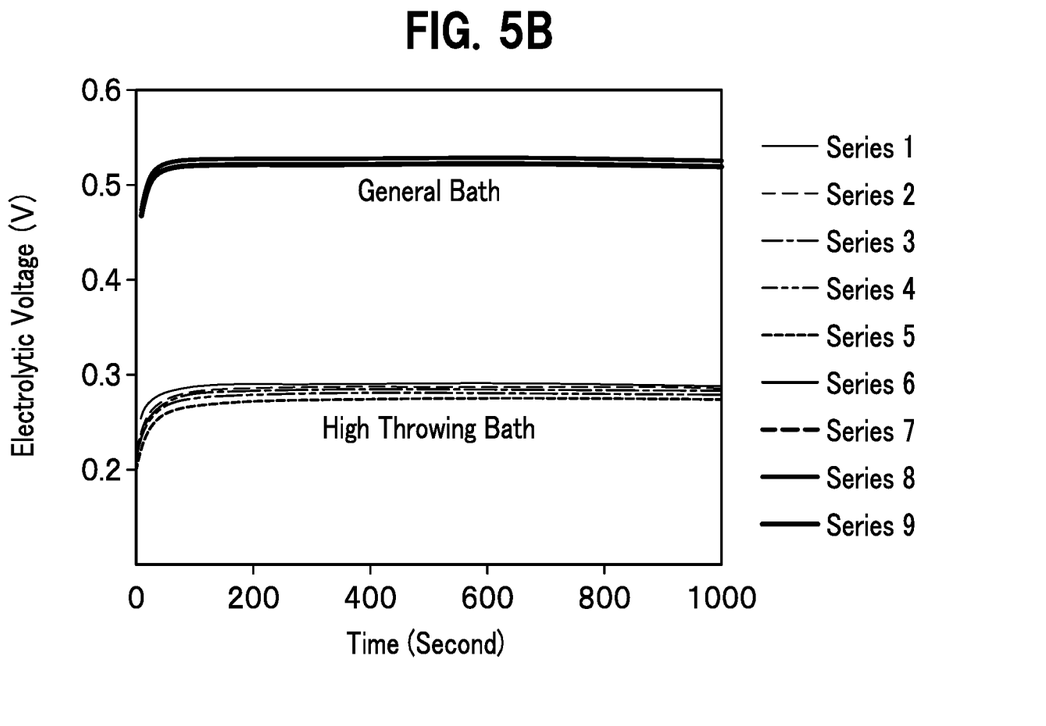
FIG. 5(b) is a graph showing the variation of an electrolytic voltage with time in a case where correction to an electrode potential by use of the feedback circuit was performed.

Furthermore, as shown in FIG. 5B, at the High throwing bath, the behavior of an electrolytic potential at the start of electrolysis were different between states (series 2 to 5) in which a coating film (black film) had been formed on the anode 12 and a state (series 1) in which a coating film had not been formed on the anode 12. And furthermore, an increase in an electrolytic voltage seen at the start of the plating indicates an increase in a concentration overvoltage caused by a decrease in the number of copper ions in the vicinity of the cathodes 13X, 13Y. In this way, a small change of plating can be observed by carrying out a feedback control to make electrode potentials of the cathodes 13X, 13Y equal to each other while keeping a summation of electric currents flowing through the cathodes 13X, 13Y constant.

DESCRIPTION OF THE SYMBOLS 1, 1A, 1B Plating apparatus
2 Plating bath
11 Plating bathtub
12 Anode
13, 13X, 13Y Cathode
14 Plating power source (rectifier)
15X, 15Y Resistance
20 Circuit part
21 Feedback circuit
22 Current measuring circuit
22X, 22Y Ammeter
23 Voltage measuring circuit
24 Constant-voltage circuit
25 Auxiliary power source

The invention claimed is:

1. A plating apparatus comprising:
an anode and a pair of cathodes which are provided in a plating bathtub;
a plating power source for supplying an electric current between the anode and the pair of cathodes; and
a feedback circuit to have an electrode potential of a first cathode of the pair of cathodes equal to an electrode potential of a second cathode of the pair of cathodes while a summation of electric currents flowing through the pair of cathodes is kept constant.

2. The plating apparatus according to claim 1, further comprising:
a first ammeter for measuring a value of an electric current flowing through the first cathode; and
a second ammeter for measuring a value of an electric current flowing through the second cathode.

3. The plating apparatus according to claim 2, further comprising:
a controller for calculating an estimated amount of a plated material on each of the pair of cathodes based on measurement results measured by the first ammeter and the second ammeter;
wherein the controller stores a relationship between a value of an electric current flowing through the pair of cathodes and an actual amount of the plated material, and calculates an estimated amount of the plated material by referring to the relationship with use of the measurement results measured by the first ammeter and the second ammeter.

4. The plating apparatus according to claim 3, wherein:
the controller calculates a theoretical amount of the plated material on each of the pair of cathodes based on the measurement results measured by the first ammeter and the second ammeter, and calculates an electric current efficiency at the pair of cathodes based on an estimated amount of the plated material and a theoretical amount of the plated material.

5. The plating apparatus according to claim 3, wherein:
the controller calculates a uniform electroplating index based on a distance between the anode and the first cathode, a distance between the anode and the second cathode, and the estimated amount of the plated material on each of the pair of cathodes.

6. The plating apparatus according to claim 2, wherein:
the controller calculates a current distribution ratio, which is a ratio of an electric current flowing through the first cathode to an electric current flowing through the second cathode, based on the measurement results measured by the first ammeter and the second ammeter.

7. The plating apparatus according to claim 4, wherein:
the controller calculates a uniform electroplating index based on a distance between the anode and the first cathode, a distance between the anode and the second cathode, and the estimated amount of the plated material on each of the pair of cathodes.

* * * * *